(12) United States Patent
Spies

(10) Patent No.: US 9,325,159 B2
(45) Date of Patent: Apr. 26, 2016

(54) POWER CONDUCTING DEVICE FOR LARGE ANGLES OF TWIST

(75) Inventor: Jonathan Spies, Wenden (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 317 days.

(21) Appl. No.: 14/008,704

(22) PCT Filed: Mar. 28, 2012

(86) PCT No.: PCT/EP2012/055513
§ 371 (c)(1),
(2), (4) Date: Sep. 30, 2013

(87) PCT Pub. No.: WO2012/130883
PCT Pub. Date: Oct. 4, 2012

(65) Prior Publication Data
US 2014/0090350 A1    Apr. 3, 2014

(30) Foreign Application Priority Data

Apr. 1, 2011 (DE) .................... 20 2011 004 776 U

(51) Int. Cl.
*F16G 13/16* (2006.01)
*H02G 3/04* (2006.01)
*H02G 11/00* (2006.01)

(52) U.S. Cl.
CPC .............. *H02G 3/0475* (2013.01); *F16G 13/16* (2013.01); *H02G 11/006* (2013.01)

(58) Field of Classification Search
CPC ..... H02G 3/0475; H02G 11/006; F16G 13/16

USPC .......................................................... 59/78.1
See application file for complete search history.

(56) References Cited

U.S. PATENT DOCUMENTS 3,282,044 A * 11/1966 Maisey .................. B65H 75/38
59/78.1
4,807,432 A * 2/1989 Mauri .................. H02G 11/006
248/49
6,481,195 B1 * 11/2002 Blase ...................... F16G 13/16
248/51

FOREIGN PATENT DOCUMENTS

| DE | 20 2005 001651 U1 | 6/2006 |
|---|---|---|
| DE | 10 2007 038567 A1 | 2/2009 |
| JP | 2009 044809 A | 2/2009 |

* cited by examiner

*Primary Examiner* — David B Jones
(74) *Attorney, Agent, or Firm* — BainwoodHuang

(57) ABSTRACT

A power conducting device guides lines, hoses or the like between a stationary connection point and a moving connection point. The power conducting device includes a first line guiding device having a first end link, a second end link, and a section that deflects between the links and is connected to the links. The line guiding device defines a channel for receiving lines, hoses or the like. The power conducting device further includes a first guiding channel, which defines a first inner ring and a first outer ring. The first line guiding device is arranged in the first guiding channel. The first end link connects to the first inner ring and the second end link connects to the first outer ring. At least one second guiding channel defines a second outer ring and a second inner ring. Certain channels can be rotated about a common axis.

9 Claims, 2 Drawing Sheets

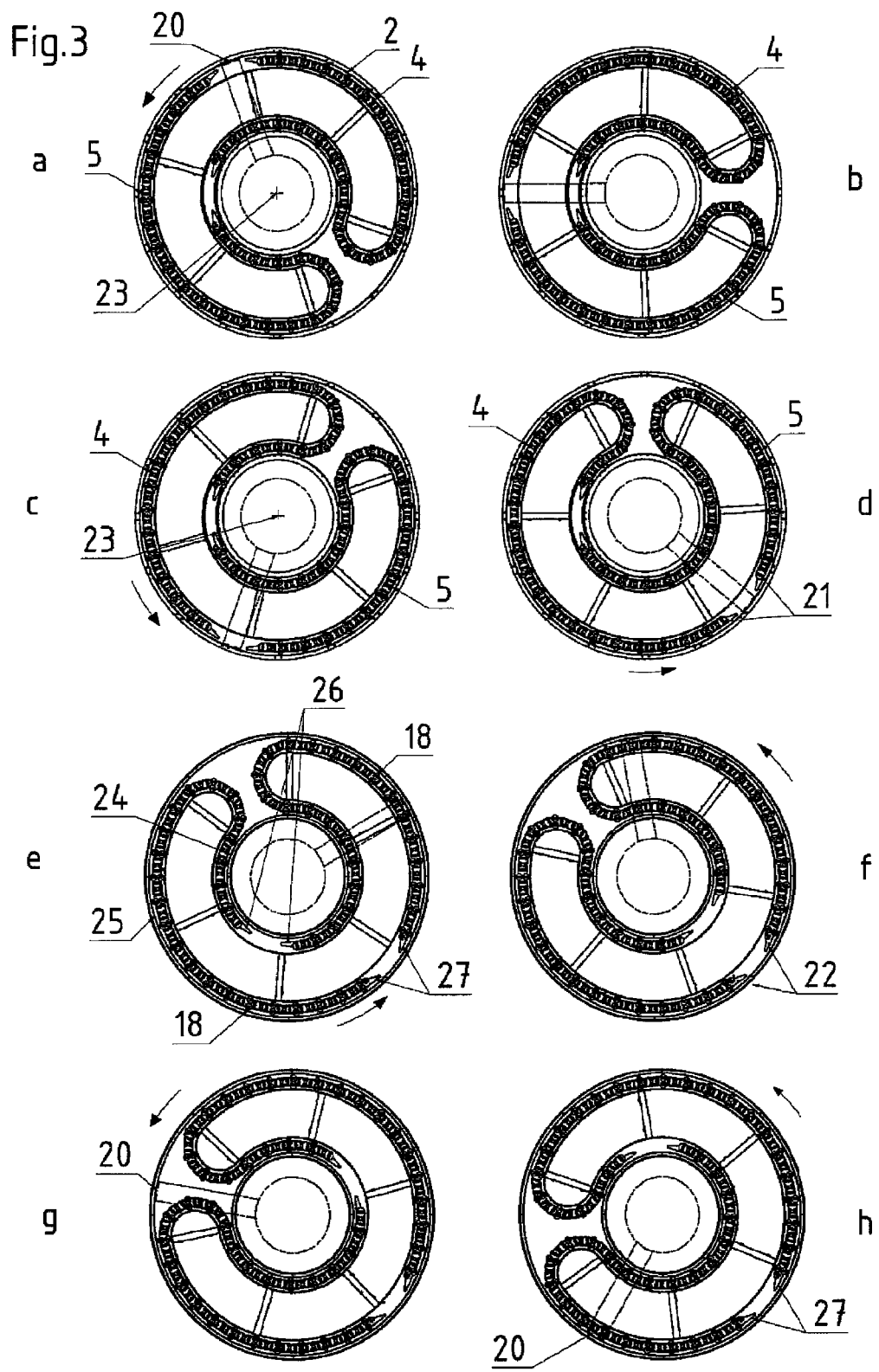

POWER CONDUCTING DEVICE FOR LARGE ANGLES OF TWIST

Figure 1:
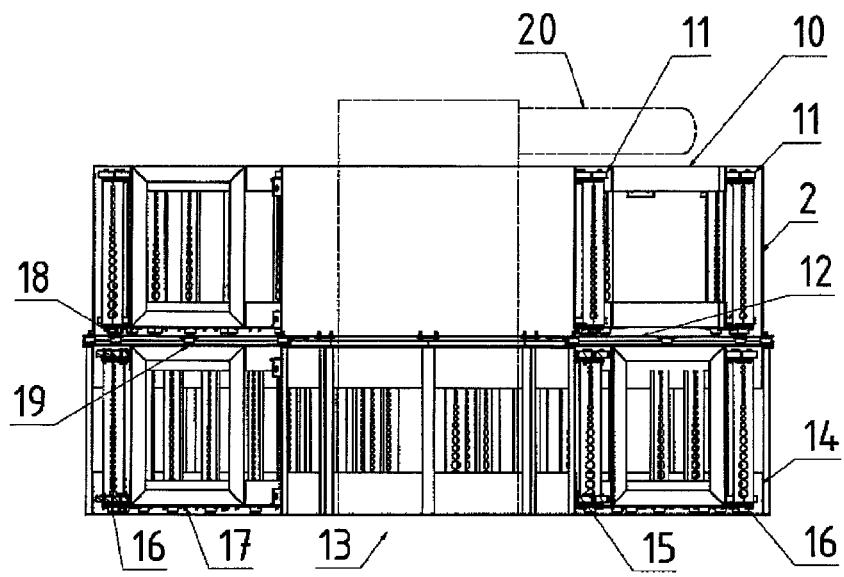

The subject matter of the invention relates to a power conducting device that comprises at least one first line guiding device and a first guiding channel, in which first guiding channel the first line guiding device is arranged.

Line guiding devices are known for the purpose of guiding lines, hoses or the like between a stationary connection point and a moving connection point. Line guiding devices of this type are also described as power conducting units or power conducting chains. The line guiding devices are installed in different apparatus, machines and devices, in particular where it is necessary to transport consumables, energy or the like by means of lines, hoses or the like from a stationary connection point to a moving connection point of a consumer. The line guiding device can be single line or multiple line.

The line guiding device comprises a first end link and a second end link. A deflectable section is provided between the end links and is connected to said end links. The section can be embodied by way of chain links that embody a channel for receiving lines, hoses or the like. A chain link can comprise two connecting links that are fundamentally arranged in parallel to one another and are connected to one another by way of at least one cross web.

Line guiding devices are arranged in such a manner that they comprise a lower run, a curved section and an upper run. Arrangements are also known in which the line guiding device is rotated by 90°, so that the power conducting device can essentially implement a circular movement. If the line guiding device is equipped with a curved radius and a rear facing curved radius, the line guiding device can be moved in two arcuate directions. In the case of an arrangement of this type it is known that the line guiding device is arranged in a guiding channel. The one end link of the line guiding device is fastened to the inner ring of the guiding channel. The other end link of the line guiding device is arranged on the outer ring of the guiding channel. One of the rings can be rotated and together with the end link embodies a driving device connection.

The line guiding device rests against the inner circumference of the outer ring and/or against the outer circumference of the inner ring by way of rotating the ring. Different angles of rotation can be achieved by means of this.

Embodiments are also known in which two line guiding devices are arranged in a counter-rotating manner, as a consequence of which larger angles of rotation can be achieved.

Relatively large angles of rotation can be achieved in dependence upon the ratio of the diameter of the outer ring to the diameter of the inner ring and the geometry of the power conducting chain. However, this requires a considerable amount of installation space.

Based on this, the object of the present invention is to provide a power conducting device that even in the case of relatively large angles of rotation comprises a compact construction.

This object is achieved in accordance with the invention by way of a power conducting device having features disclosed herein. Advantageous further developments and embodiments of the power conducting device in accordance with the invention are disclosed herein as well.

The power conducting device in accordance with the invention comprises at least one first line guiding device for guiding lines, hoses or the like between a stationary connection point and a moving connection point. The line guiding device is embodied by way of a first end link and a second end link and a section that can be deflected between the two end links and is connected to said end links. The line guiding device embodies a channel for receiving lines, hoses or the like. The power conducting device further comprises a first guiding channel that is embodied by way of a first inner ring and a first outer ring. The first line guiding device is arranged in the first guiding channel. The first end link is connected to the first inner ring and the second end link is connected to the first outer ring.

The power conducting device in accordance with the invention is characterized by virtue of the fact that at least one second guiding channel is provided, which is embodied by way of a second inner ring and a second outer ring. The first and the at least one second guiding channel are arranged one on top of the other and can be rotated relative to one another about a common axis. A compact construction of the power conducting device is achieved by way of this construction of the power conducting device in accordance with the invention.

At least one second line guiding device is arranged in the at least one second guiding channel, wherein the second line guiding device comprises a first connection link and a second connection link and a section that can be deflected between the connection links that is connected to said connection links. The first connection link is connected to the second inner ring and the second connection link is connected to the second outer ring.

In addition to providing a compact construction of the power conducting device, this embodiment of the power conducting device in accordance with the invention also renders it possible to achieve large angles of rotation. The power conducting device can comprise a plurality of guiding channels that are arranged one on top of the other, in which in each case at least one line guiding device is provided.

If only two guiding channels are provided, then it is advantageous if the first guiding channel can be rotated and the second guiding channel is stationary. The second guiding channel can be connected to a corresponding assembly frame at the base or the like.

In accordance with an advantageous embodiment of the power conducting device in accordance with the invention, it is proposed that a coupling unit is provided, so that two adjacent guiding channels are coupled to one another. The coupling unit is embodied in such a manner that upon achieving a first end position, the rotatable inner ring or outer ring of adjacent guide channels are coupled. In a second end position that is achieved in dependence upon the angle of pivot, the rotatable inner or outer rings are decoupled.

If the power conducting device in accordance with the invention is embodied in such a manner that it comprises two guiding channels that are arranged one on top of the other, then it is preferred that the first guiding channel can be rotated and the second guiding channel is arranged in a stationary manner. If the inner ring of the first guiding channel can be rotated, then it can be rotated during operation until it achieves a first end position. During this rotation process, the line guiding device that is arranged in the first guiding channel moves. If the first end position is achieved, then the first inner ring becomes coupled with the second inner ring of the second guiding channel. In the case of a further movement and/or rotation, the entire first guiding channel having the first line guiding device is rotated. The second inner ring of the second guiding channel is simultaneously rotated and the second line guiding device that is arranged in the line guiding channel subsequently moves until said second line guiding device achieves the second end position.

If a driver device is moved back from the second end point to the first end point, then initially the second line guiding device moves and the first guiding channel rotates until it achieves the first end position in which the first guiding channel and the second guiding channel are decoupled. In the case of a further rotation of the driving device and/or the first inner ring, the line guiding device moves in the first guiding channel.

An as close to friction-free movement as possible is to be rendered possible by means of friction-reducing elements, in particular sliders or rollers are arranged between the first and the second guiding channel. The elements, in particular sliders or rollers are connected to the first and/or the second guiding channel.

In accordance with a further advantageous embodiment of the power conducting device, it is proposed that the second guiding channel comprises a covering wall, on which the sliders or rollers can be moved.

For the purposes of stability and in order to simplify the movement, it is proposed that the power conducting device in accordance with the invention is embodied in such a manner that the second and the first guiding channel are guided.

In order to achieve a further improvement of the handling and/or movement of the first and/or second line guiding device, it is proposed that at least one of the guiding channels comprises a moving guiding device, in particular a guiding carriage.

Further advantages and characteristics of the power conducting device in accordance with the invention are further described with reference to the exemplary embodiment that is illustrated in the drawing, however the subject matter of the invention is not limited to this specific exemplary embodiment. In the drawings:

FIG. 1: illustrates a sectional view of a power conducting device

Figure 2:
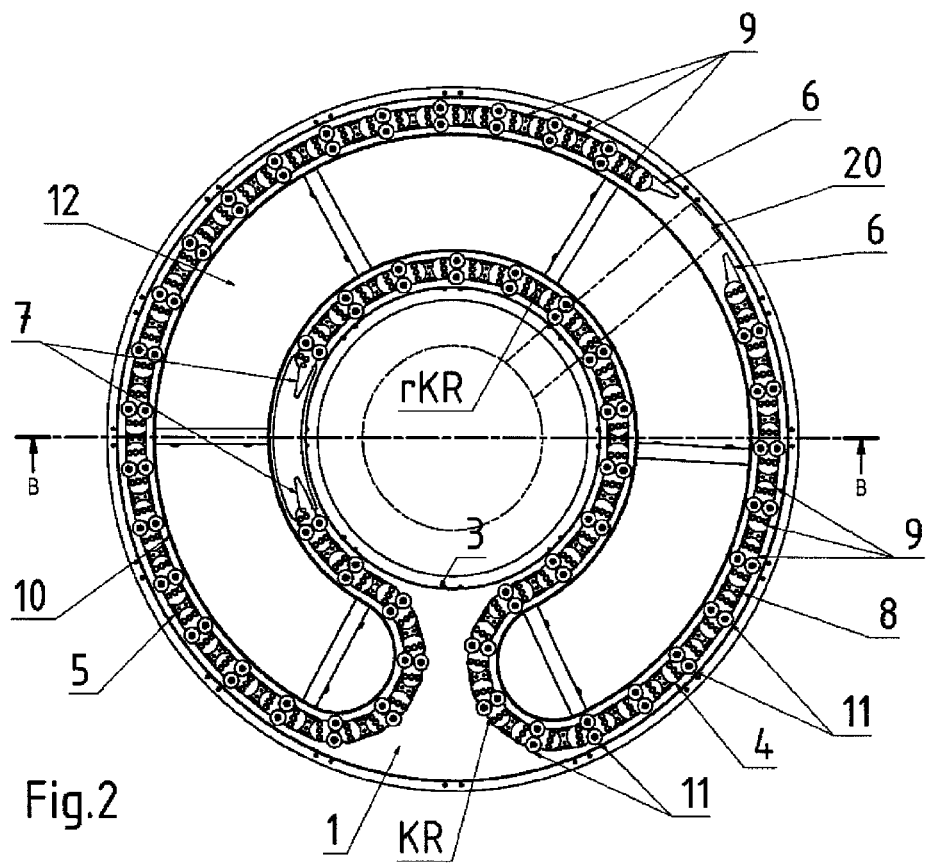

FIG. 2: illustrates the power conducting device in accordance with FIG. 1 in a plan view, and FIGS. 3*a* to 3*h*: illustrate snapshots in dependence upon angle of rotation.

FIG. 1 illustrates a preferred exemplary embodiment of the power conducting device in accordance with the invention in a sectional view. A plan view of the power conducting device in accordance with the invention is illustrated in FIG. 2. The power conducting device comprises a first guiding channel 1. The first guiding channel 1 is embodied by way of a first outer ring 2. The outer ring 2 can be embodied by way of a wall. It also creates the possibility that the first outer ring is embodied by way of a lattice structure.

The first guiding channel 1 is defined by way of a first inner ring 3. In the illustrated exemplary embodiment, two first line guiding devices 4, 5 are arranged in the annular first guiding channel 1. The first line guiding devices 4, 5 are arranged in a counter-rotating manner. The arrangement of the two first line guiding devices is not mandatory. It also creates the possibility that only a first line guiding device 4 is provided in the first guiding channel 1. The first line guiding devices 4, 5 comprise in each case a first end link 6 and a second end link 7. A deflectable section 8 is provided between the end links 6, 7, which deflectable section is embodied by way of chain links 9 in the illustrated exemplary embodiment.

The first end links 6 are connected to the first outer ring 2. The second end links 7 are connected to the first inner ring 3.

A guiding carriage 10 is arranged between the first line guiding devices 4, 5, which guiding carriage is embodied essentially in a kidney shape. The first line guiding devices 4, 5 are positioned on the first outer ring 2 and/or on the first inner ring 3 by way of the guiding carriage 10, so that the first line guiding devices 4, 5 are stabilized.

Each first line guiding device 4, 5 comprises a curved radius KR and a rear facing curved radius rKR. The first line guiding devices 4, 5 move in two circular directions by way of the combination of the curved radius KR and rear facing curved radius rKR.

It is evident from the illustrations in FIG. 1 and FIG. 2 that rollers 11 are arranged on selected chain links 9. The rollers 11 are arranged on the outer and inner side of the upper band of the chain links so that as the line guiding devices move the rollers 11 lie on the inner side of the outer ring 2 and the outer side of the guiding carriage 10 respectively on the outer side of the inner ring 3 and the inner side of the guiding carriage. As a consequence, any friction between the line guiding devices and the outer ring, the inner ring and the movable guiding carriage is reduced.

Sliders, rollers or the like are provided on the lower chain belt of the first line guiding devices 4, 5, which chain belt is embodied by way of the side connecting links of the chain links 9, so that the first line guiding devices 4, 5 can slide on the base 12.

A second guiding channel 2 is provided underneath the first guiding channel 1, which second guiding channel is embodied corresponding to the first guiding channel 1.

The second guiding channel 13 comprises a second outer ring 14 and a second inner ring 15. Two second line guiding devices 16 that are arranged in a counter-rotating manner are provided inside the second guiding channel 13. In addition, the second guiding channel 13 comprises a guiding carriage 17.

The first guiding channel 1 and the second guiding channel 13 can be rotated relative to one another about a common axis. Corresponding rollers 19 are provided for this purpose. The rollers 19 are arranged on the second guiding channel so that the base 12 of the first guiding channel 1 lies on the rollers 19. In addition, rollers 18 that are arranged radially outwards are provided so that the first outer ring of the first guiding channel 1 can be rotated past these rollers 19.

A driving device 20 is illustrated in FIGS. 1 and 2 by way of a dashed line. FIG. 2 illustrates the position of the driving device 20 in a first position.

FIGS. 3*a* to 3*b* illustrate snapshots of the positions of the first line guiding devices 4, 5 if the first outer ring 2 is rotated.

The driving device 20 is rotated with the first outer ring 2 anti-clockwise in the direction of the arrow. The position of the first end links 6 that are fastened to the first outer ring 2 changes by way of rotating the driving device 20 and the outer ring 2. The moving connection point is described by way of the reference numeral 21.

If the driving device 20 starting from the first end position illustrated in FIG. 2 is moved into the position that is illustrated in FIG. 3*d*, then the first outer ring 2 is coupled to the first inner ring 3 so that in the case of further rotation of the driving device 20 the entire first guiding channel 1 is rotated about the axis 23. The driving device 20 and/or the first guiding channel 1 are connected to the second inner ring 24. The first connecting links 26 of the second line guiding devices 18 are connected to the second inner ring 24. The second outer ring 25 of the second guiding channel 27 is stationary. If the driving device 20 is rotated further in the anti-clockwise direction, the second line guiding devices 18 assume the positions that are illustrated in FIGS. 3*e* to 3*h*. In the case of this rotation, the second inner ring 24 and the first guiding channel 1 that is arranged on the second guiding channel is rotated synchronously, since the second inner ring 24 and the first guiding channel 1 are coupled to one another.

The second connecting links 27 are arranged stationary on the second outer ring 25 embody a stationary connection point 22.

Angles of rotation greater than 360° are possible by way of the embodiment of the power conducting device. The power conducting device that is illustrated in FIGS. 1 to 3 renders possible an angle of rotation of up to 560°.

Even larger angles of rotation can be achieved by way of an additional arrangement of a further second guiding channel, without having to increase the diameter of the guiding channels. A compact construction of the power conducting device is achieved.

If the driving device 20 is rotated from its second end position that is illustrated in FIG. 3h into the first end position that is illustrated in FIG. 2, the second line guiding devices 18 are initially rotated with the second inner ring and the first guiding channel 1 to the position that is illustrated in FIG. 3b. As the maximum possible angle of rotation of the second line guiding devices is achieved, the first outer ring is decoupled from the first inner ring.

The stationary connection point 22 is provided in the illustrated exemplary embodiment on the second outer ring, while the moving connection point 21 is arranged on the first outer ring. It is also possible that the stationary connection is provided on the inner ring and the moving connection point is also positioned on the inner ring of the first and/or of the second guiding channel. The first inner ring and the second outer ring are then moved instead of moving the first outer ring.

LIST OF REFERENCE NUMERALS

1 First Guiding Channel
2 First Outer Ring
3 First Inner Ring
4, 5 First Line Guiding Device
6 First End Link
7 Second End Link
8 Section
9 Chain links
10 Guiding Carriage
11 Rollers
12 Base
13 Second Guiding Channel
14 Second Outer Ring
15 Second Inner Ring
16 Second Line Guiding Device
17 Guiding Carriage
18 Rollers
19 Rollers
20 Driving device
21 Moving Connection
22 Stationary Connection
23 Axis
24 Second Inner Ring
25 Second Outer Ring
26 First Connecting Link
27 Second Connecting Link

The invention claimed is:

1. A power conducting device, comprising:
at least one first line guiding device for guiding a line between a stationary connection point and a moving connection point, wherein each first line guiding device, comprises a first end link and a second end link and a section that can be deflected between the first and second end links and is connected thereto, the first and second end links defining a receiving channel for receiving the line,
a first inner ring and a first outer ring which define a first guiding channel,
wherein the first line guiding device is arranged in the first guiding channel and the first end link is connected to the first inner ring and the second end link is connected to the first outer ring,
wherein a second inner ring and a second outer ring defines at least one second guiding channel,
wherein the first guiding channel and the at least one second guiding channel can be rotated relative to one another about a common axis,
wherein at least one second line guiding device is arranged in the at least one second guiding channel, wherein the second line guiding device comprises a first connection link and a second connection link and a section that can be deflected between the connection links and is connected thereto, and
wherein the first connection link is connected to the second inner ring and the second connection link is connected to the second outer ring.

2. The power conducting device as claimed in claim 1, wherein the first guiding channel can be rotated while at least one second guiding channel remains stationary.

3. The power conducting device as claimed in claim 1, further comprising:
a coupling unit that couples two adjacent guiding channels.

4. The power conducting device as claimed in claim 1, further comprising:
friction-reducing elements arranged between the first guiding channel and the at least one second guiding channel.

5. The power conducting device as claimed in claim 4, wherein the friction-reducing elements include:
rollers connected to at least one of the first guiding channel and the at least one second guiding channel.

6. The power conducting device as claimed in claim 4, wherein the at least one second guiding channel comprises a covering wall.

7. The power conducting device as claimed in claim 1, wherein the first guiding channel and the at least one second guiding channel are guided.

8. The power conducting device as claimed in claim 1, wherein at least one of the first guiding channel and the at least one second guiding channel includes, as a moving guiding device, a guiding carriage.

9. The power conducting device as claimed in claim 4, wherein the first guiding channel comprises a base.

* * * * *